S. C. WHARTON.
Sand-Band.

No. 197,436. Patented Nov. 20, 1877.

Attest:
Jno. P. Brooks.
August Petsohu.

Inventor:
Samuel C. Wharton,
by Louis Bagger & Co.,
attys.

UNITED STATES PATENT OFFICE.

SAMUEL C. WHARTON, OF WARSAW, INDIANA.

IMPROVEMENT IN SAND-BANDS.

Specification forming part of Letters Patent No. 197,436, dated November 20, 1877; application filed October 17, 1877.

*To all whom it may concern:*

Be it known that I, S. C. WHARTON, of Warsaw, in the county of Kosciusko and State of Indiana, have invented certain new and useful Improvements in Hubs; and I do hereby declare that the following is a full, clear, and exact description thereof, which will enable others skilled in the art to which it appertains to make and use the same, reference being had to the accompanying drawings, which form a part of this specification, and in which—

Figure 1:
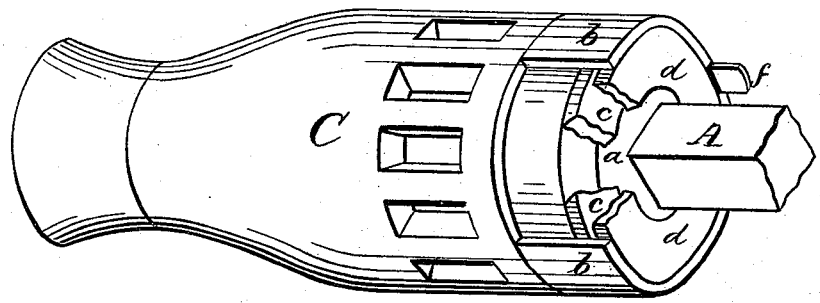
Figure 2:
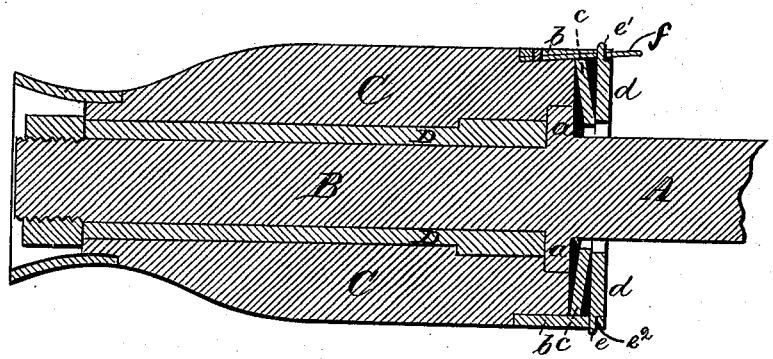

Figure 1 is a perspective view of the end of an axle having a hub provided with my improvement, a part being broken away to show the construction; and Fig. 2 is a longitudinal section of the same.

Similar letters of reference indicate corresponding parts in both figures.

The object of my invention is to prevent dust and dirt from working into the axle-box, between it and the spindle, the effect of which is to cut or wear the axle out in a very short time; and to this end my invention consists in arranging a packing-ring of rubber or other suitable material at the inner or large end of the hub, and holding it in place by a metallic washer and spring, all as I shall now proceed more fully to describe.

Referring to the drawings hereto annexed, A is the axle of a vehicle, and B the spindle thereof, separated from the axle proper by a circumferential flange, *a*. C is the hub, and D the axle-box. The former has a recess, accommodating flange *a*, and at its inner or large end an iron ring, *b*, projecting beyond its end, as shown. In the recess or receptacle formed by this ring I place a ring or washer, *c*, made of rubber, leather, or other suitable material, and having a central perforation fitting over the axle, as shown. This ring perfectly covers the joint between the flange *a* of the axle and the axle-box, and absolutely excludes dust and dirt from the latter.

To keep the washer *c* in place, I employ a ring, *d*, made of iron or other metal, and having two projections or studs, $e\ e^1$, one of which fits in a perforation, $e^2$, in ring *b*, while the other engages with a spring lock or clasp, *f*, secured to ring *b*, and which may be of any suitable construction. The ring *d*, being thus easily removable, admits of the packing-ring *c* being renewed without difficulty when worn out.

The advantages of my invention will be readily understood from the foregoing description, and by reference to the drawings hereto annexed. Dust and dirt are entirely and completely excluded from the axle-box, and the axle will, in consequence, not wear out as rapidly as when the hub is not provided with my improvement.

Having thus described my invention, I claim and desire to secure by Letters Patent of the United States—

The combination of the axle A, axle-box D, hub C, and ring *b*, having perforation $e^2$, with the packing-ring *c*, retaining ring or cover *d*, having studs $e\ e^1$, and spring-catch *f*, all arranged and operating substantially as described, for the purpose herein shown and specified.

In testimony that I claim the foregoing as my own I have hereto affixed my signature in presence of two witnesses.

SAMUEL C. WHARTON.

Witnesses:
   S. B. FRASIER,
   T. A. GOODWIN.